United States Patent Office 3,104,267
Patented Sept. 17, 1963

3,104,267
PREPARING OF LONG CHAIN ALKYL AROMATIC HYDROCARBONS
Donald H. Antonsen, Wilmington, Del., and Alfred E. Hirschler, Springfield, Pa., assignors to Sun Oil Company, Philadelphia, Pa., a corporation of New Jersey
No Drawing. Filed Sept. 12, 1960, Ser. No. 55,169
12 Claims. (Cl. 260—671)

This invention relates to the preparation of long chain alkyl aromatic hydrocarbons which boil in the lubricating oil range and which are useful as special lubricants of high viscosity index.

It has been proposed heretofore to prepare long chain alkyl aromatic hydrocarbons by simultaneously polymerizing an olefin and alkylating an aromatic with the olefinic polymerization product. Such a procedure is described in McCall et al. United States Patent No. 2,824,145. The catalyst used is a combination of a titanium halide, such as $TiCl_4$, with an alkyl aluminum halide such as ethyl aluminum sesquichloride. The polymerization can be conducted at room temperature or moderately elevated temperatures by contacting the olefin with a mixture of the aromatic hydrocarbon and the catalytic components. The reaction as conducted heretofore has produced a wide range of alkyl aromatics in which the chain length varies considerably. For example, in the reaction of ethylene with toluene, the alkyl chains which attach to the aromatic nucleus have varied from $C_4$ to $C_{20}$ and the alkylation product has been composed largely of material boiling below the lubricating oil range.

The present invention provides an improved procedure for effecting this type of reaction, whereby alkylation products can be produced which are predominently in the lubricating oil range and which have high viscosity indexes.

It has now been found that the alkylating ability of the above-discussed type of catalyst system depends upon the presence of small amounts of water in the system. The water may be present due to more or less trace amounts in the reactor used or in the aromatic and olefinic reactants themselves. In any event, its presence is necessary in order for the combination of a titanium halide and an alkyl aluminum halide to be catalytic for effecting the alkylation reaction. We have found that in a rigorously dried system this type of catalyst will polymerize the olefin but no alkylation of the aromatic nucleus will take place. Hence, although no mention is made in the patent above referred to of water being present, the described preparation of alkylated aromatics depended upon the inadvertent presence of a small amount of water in the system.

The present invention depends upon the above-discussed effect of the presence of water. According to the invention the polymerization reaction is isolated from the alkylation reaction by excluding water from the system. Thus the first step of the process involves only the polymerization of the olefin, and at this stage the aromatic serves only as a reaction medium. Further in accordance with the invention it has now been found that the alkylation reaction can be effected after the desired degree of polymerization has been reached by introducing either hydrogen chloride or hydrogen bromide into the system. This causes the olefinic polymer to alkylate the aromatic almost instantaneously and thereby form alkylated products having molecular weights mainly in the desired lubricating oil range.

The procedure according to the invention provides several advantages over that heretofore employed. It permits a better regulation of the product distribution and allows a higher yield of the desired lubricating oil product to be obtained. Also it gives a longer catalyst life. Another important advantage is that the quality of the oily product with respect to high viscosity index is better than when the polymerization and alkylation reactions occur concurrently. This is due to the fact that the present procedure tends to yield a product in which the alkyl chain is attached at the 2-position to the benzene ring, whereas the prior procedure gives a considerable amount of product in which the point of attachment is more internally of the chain. This difference in molecular structure affects the viscosity index of the product, since higher values are obtained when the alkylation occurs near the end of the chain. The more internal alkylation effected by the prior art procedure is believed to be a result of a dealkylation reaction occurring at the same time that alkylation and polymerization occur. Dealkylation causes carbonium ions in which the double bond can move up and down the chain, so that the ensuing alkylation of aromatic rings by the carbonium ions results in a random point of attachment. In any event the oily product obtained tends to have a lower viscosity index than that produced by the present process.

According to the invention, alkylated aromatic hydrocarbons boiling in the lubricating oil range and having high viscosity indexes are prepared by first admixing an alkylatable aromatic with a titanium halide in which the titanium has a valence of at least three and with an alkyl aluminum halide in the absence of any moisture. The titanium and aluminum compounds interact to form a catalyst complex part of which is soluble and the remainder insoluble in the aromatic hydrocarbon. The mixture is then contacted at a temperature in the range of 0–50° C., more preferably 10–40° C., with an alpha olefin in anhydrous form. This causes the olefin to polymerize, and the contacting is continued until the desired amount of polymerization has occurred. The mixture is then contacted with either HCl or HBr in dry state, the amount of such hydrogen halide being at least 0.5 mole per mole of the aluminum compound used. This causes immediate alkylation of the aromatic by the polymer with an attendant sharp reduction in the bromine number of the reaction mixture. The catalyst is then deactivated, for example, by the addition of an alcohol, and oily alkylation product is recovered from the reaction mixture. Generally a small amount of solid product also is produced.

The starting aromatic hydrocarbon can be benzene or any alkylatable benzene derivative which is liquid at the reaction temperature employed. Examples are toluene, the xylenes, mesitylene, pseudocumene, hemimellitene, durene, isodurene, ethyl benzene, diethyl benzene, isopropyl benzene, amyl benzenes, octyl benzenes, cymene, etc., or mixtures thereof. Generally benzene, toluene and the xylenes are preferred due to availability.

The titanium halide used can be $TiCl_3$, $TiCl_4$, $TiBr_3$ or $TiBr_4$. Titanium tetrachloride is the preferred titanium compound. The aluminum compound can be any alkyl aluminum chloride or bromide having one to two alkyl groups which contain, for example, one to twelve carbon atoms. The aluminum compound can be an alkyl aluminum dihalide, a dialkyl aluminum monohalide or an alkyl aluminum sesquihalide. Examples are methyl aluminum dibromide, ethyl aluminum dichloride, diethyl aluminum chloride, ethyl aluminum sesquichloride, dipropyl aluminum bromide, isobutyl aluminum dichloride, amyl aluminum sesquibromide, dioctyl aluminum chloride, dodecyl aluminum dibromide and the like. Ethyl aluminum sesquichloride is preferred because of availability and cost. The molar ratio of the aluminum compound to the titanium halide can vary from 0.1 to 1.0 and preferably is about 0.3–0.7. The proportion of aluminum compound to the aromatic hydrocarbon can vary widely, for example, in the range of 0.1–2.0 millimoles per 100 g. of the aromatic.

The olefin reactant can be any alpha olefin having 2–10 carbon atoms per molecule. Ethylene generally is preferred. Branched chain olefins such as isobutylene can be used although they tend to lower the viscosity index of the product due to the higher degree of branching of the alkyl chains. However the branching is advantageous with respect to reducing the pour point of the oily product. Two or more olefins can be used together to form copolymers which then alkylate the aromatic. Surprisingly, when the olefin used is ethylene, chain branching nevertheless occurs to some extent. It has been shown by nuclear magnetic resonance and infrared spectra that in such case about one methyl branch occurs for each 4–5 carbon atoms in the chain.

As previously stated, the temperature at which contact between the olefin and the reaction mixture is effected is in the range of 0–50° C. and more preferably 10–40° C. The contacting should be done with agitation of the reaction mixture. Any pressure can be used from atmospheric up to 500 p.s.i.g. or higher if desired. Since the reaction rate is controlled by diffusion of the olefin into the reaction mixture, an increase in pressure will increase the rate of reaction when the olefin employed is in vapor phase at the operating temperature. At the beginning of the reaction the rate tends to be high and it decreases as the reaction proceeds. Also the molecular weight of the polymer increases, as would be expected, as the reaction proceeds. The reaction can be carried out for whatever time is best for obtaining the highest yield of polymer of the desired molecular weight. Times generally will vary from about one-half hour to ten hours. Usually after about 10 hours the catalyst will have lost its polymerizing activity.

Following the polymerization reaction dry HCl or HBr in gas form is introduced into the reaction mixture which is maintained under agitation. No regulation of temperature need be made prior to introducing the hydrogen halide. The amount used should be at least 0.5 mole per mole of the aluminum compound and preferably about an equal molar amount. However, a large excess, such as 20 moles per mole of the aluminum compound, can be used without adverse effect. In determining molar ratios where the aluminum compound is a sesquihalide, the sesquihalide is herein considered to have the formula $R_{1.5}AlX_{1.5}$ wherein R is the alkyl group and X is the halogen. Addition of the hydrogen halide causes the alkylation reaction to proceed rapidly with heat being released and the bromine number of the reaction mixture drops almost immediately to essentially zero within the accuracy of the bromine number test. This shows that the double bonds in the polymer molecules have disappeared via alkylation at the aromatic nucleus. The recovered oily products have refractive indexes typical of long chain alkyl benzenoid hydrocarbons.

The following examples illustrate the invention more specifically:

EXAMPLE I

In a small glass reactor provided with a magnetic stirrer, a mixture was prepared composed of benzene, ethyl aluminum sesquichloride and titanium tetrachloride in amounts such that the mixture contained 1.5 millimoles of the aluminum compound per 100 g. of benzene and 0.57 mole of it per mole of $TiCl_4$. Precautions taken to insure an anhyrous system included prior distillation of the benzene from a sodium-benzene dispersion and rinsing of the reactor with a solution of aluminum triethyl in benzene followed by rinsing with the previously dried benzene. After preparation of the catalyst system mixture, it was allowed to age at about 20° C. for 20 minutes with stirring and then dry ethylene was fed into the reactor to maintain a pressure of about 2 p.s.i.g. over a time of 3 hours while the mixture was being stirred. The ethylene fed to the reactor was bubbled through aluminum triisobutyl to insure dryness. The temperature during this 3 hour reaction period was maintained at 19–23° C.

At the end of the reaction period a sample of the reaction mixture was taken and its bromine number was determined to be about 35, indicated the presence of olefinic groups. However, by distillation and refractive index determinations on cuts, it was found that the reaction product was entirely ethylene polymers and that the benzene had not reacted.

Dry HCl was then added to the reaction mixture in a proportion of 1.0 mole HCl per mole of the aluminum sesquihalide. Heat was immediately released, showing that immediate alkylation of the benzene with the ethylene oligimer occurred. The reaction mixture was stirred for 90 minutes during which time small samples were taken from time to time for bromine number testing. Test results showed, however, that within one minute reaction time the bromine number had dropped to 1.5, indicating that the alkylation reaction was substantially complete immediately after the addition of HCl. Preparation of the mixture for analysis involved mixing with isopropanol to deactivate the catalyst, filtration to remove solid polymer, then admixing with pentane and water and separation of the two layers, washing of the pentane layer with water, and distillation of pentane and unreacted benzene from the washed material. The amount of solid polymer, based on the ethylene and benzene reacted, was 8.6% by weight. The resulting oily product was vacuum distilled at pressures less than 1 mm. Hg absolute to obtain six distillate cuts and a residue. Boiling ranges of these products, converted to atmospheric pressure, and tests obtained are shown in Table I.

*Table I*

| Cut No. | B.P., °C. @ Atmos. Pres. | Wt. percent on Oily Product | Refractive Index $\frac{20.3}{D}$ | Bromine No. |
|---|---|---|---|---|
| 1 | int.–303 | 9.5 | 1.4770 | 3.0 |
| 2 | 303–371 | 11.4 | 1.4769 | 1.0 |
| 3 | 371–404 | 7.6 | 1.4769 | 1.0 |
| 4 | 404–454 | 8.9 | 1.4769 | 0.5 |
| 5 | 454–493 | 25.9 | 1.4756 | 0.5 |
| 6 | 493–538 | 24.1 | 1.4734 | |
| Residue | >538 | 12.6 | 1.4775 | 1.0 |

The refractive indexes listed are typical of long chain alkylated benzenes. Cuts 5 and 6 were combined and the following test results were obtained on the mixture: kinematic viscosity @ 100° F.=48.14 cs. and @ 210° F.=7.16 cs.; viscosity index=108; pour point=+20° F. A higher viscosity index would have resulted if the catalyst had been deactivated shortly after the alkylation reaction was completed.

EXAMPLE II

Another run was made in a 5 l. stainless steel reactor. In this case the ratio of aluminum sesquihalide to $TiCl_4$ was about 0.50, the reaction temperature was maintained at about 40° C. and pressure in the reactor ranged up to about 30 p.s.i.g. Otherwise essentially the same procedure was followed as described in the preceding example. The ethylene polymerization step was carried out for about 340 minutes, and the polymerization product at that time had a bromine number of 22.5. Dry HCl was then introduced into the reactor and alkylation of the benzene by the ethylene oligimer occurred immediately. Upon working up the product, it was found that the yield of oil boiling above 650° F. accounted for 75% of the ethylene consumed in the reaction. The amount of solid product obtained corresponded to 4.8% by weight of ethylene consumed. Distillation of the oil gave cuts having boiling ranges at reduced pressure and properties as shown in Table II.

Table II

| Cut No. | B.P., °C. (mm. Hg) | Wt. Percent on Oily Product | Br. No. | Kinematic viscosities, cs. 100° F. | Kinematic viscosities, cs. 210° F. | VI | R.I. 20.3 D | Pour Point, °F. |
|---|---|---|---|---|---|---|---|---|
| 1 | 150–212 (0.24) | 14.5 | 1.0 | | | | 1.4785 | |
| 2 | 212–282 (0.27) | 21.2 | 1.0 | 47.90 | 6.93 | 110 | 1.4781 | +10 |
| 3 | 282–343 (0.50) | 25.4 | 1.5 | 70.22 | 8.88 | 108 | 1.4766 | +20 |
| Residue | >343 | 38.9 | 0.5 | | | | 1.4788 | |

We claim:

1. Method of preparing long chain alkyl aromatic hydrocarbons which comprises contacting an alpha olefin in dry state at a temperature in the range of 0–50° C. with an anhydrous catalyst system comprising an alkylatable aromatic hydrocarbon containing a catalytic mixture of (1) a titanium halide in which the titanium has a valence of at least three and wherein the halogen is selected from the group consisting of chlorine and bromine and (2) an aluminum compound selected from the group consisting of alkyl aluminum dihalides, dialkyl aluminum halides and alkyl aluminum sesquihalides wherein the halogen is selected from the group consisting of chlorine and bromine, whereby the alpha olefin is polymerized to a long chain olefin without substantial reaction of said aromatic hydrocarbon, and then contacting the reaction mixture with a dry hydrogen halide selected from the group consisting of hydrogen chloride and hydrogen bromide in amount of at least 0.5 mole per mole of said aluminum compound, whereby said long chain olefin alkylates the aromatic hydrocarbon.

2. Method according to claim 1 wherein the titanium halide is $TiCl_4$.

3. Method according to claim 1 wherein said temperature is in the range of 10–40° C.

4. Method according to claim 1 wherein the hydrogen halide is HCl.

5. Method according to claim 1 wherein said alpha olefin is ethylene.

6. Method according to claim 5 wherein said aluminum compound is ethyl aluminum sesquichloride.

7. Method according to claim 1 wherein the molar ratio of the aluminum compound to the titanium halide is in the range of 0.1–1.0.

8. Method of preparing long chain alkyl aromatic hydrocarbons which comprises contacting ethylene in dry state at a temperature in the range of 10–40° C. with an anhydrous catalyst system comprising an aromatic selected from the group consisting of benzene, toluene and xylene containing a catalytic mixture of (1) a titanium tetrahalide in which the halogen is selected from the group consisting of chlorine and bromine and (2) an aluminum compound selected from the group consisting of alkyl aluminum dichlorides, dialkyl aluminum chloride and alkyl aluminum sesquichloride, whereby the ethylene is polymerized to a long chain olefin without substantial reaction of said aromatic, and then contacting the reaction mixture with a dry hydrogen halide selected from the group consisting of hydrogen chloride and hydrogen bromide in an amount of at least 0.5 mole per mole of said aluminum compound, whereby said long chain olefin alkylates the aromatic hydrocarbon.

9. Method according to claim 8 wherein the titanium tetrahalide is titanium tetrachloride.

10. Method according to claim 9 wherein the aluminum compound is ethyl aluminum sesquichloride.

11. Method according to claim 10 wherein the molar ratio of the aluminum compound to the titanium tetrahalide is 0.3–0.7.

12. Method according to claim 11 wherein the hydrogen halide is hydrogen chloride and is used in amount of about one mole per mole of aluminum compound.

References Cited in the file of this patent

UNITED STATES PATENTS 2,824,145  McCall et al. _____ Feb. 18, 1958
2,831,040  Roh et al. _____ Apr. 15, 1958